United States Patent

Sakurai

[15] 3,700,959

[45] Oct. 24, 1972

[54] HORIZONTAL DEFLECTION CIRCUITS FOR TELEVISION RECEIVERS

[72] Inventor: Yasunobu Sakurai, Kawasaki, Japan

[73] Assignee: Denki Onkyo Company, Limited, Tokyo, Japan

[22] Filed: Sept. 23, 1970

[21] Appl. No.: 74,550

[30] Foreign Application Priority Data

Sept. 30, 1969 Japan ......................44/92793

[52] U.S. Cl................315/29, 178/7.3 R, 315/27 TD

[51] Int. Cl................................................H01j 29/70

[58] Field of Search...........315/22, 26, 29; 331/154; 310/8.7, 8.1, 9.7, 9.8; 178/7.3 R

[56] References Cited

UNITED STATES PATENTS

| | | | |
|---|---|---|---|
| 2,817,019 | 12/1957 | Creveliny | 331/154 X |
| 3,026,488 | 3/1962 | Lister et al. | 331/154 X |
| 3,290,595 | 12/1966 | Novotny | 331/154 X |
| 3,484,647 | 12/1969 | McGuinness | 315/22.5 |
| 2,985,849 | 5/1961 | Kelly | 331/154 X |
| 2,606,304 | 8/1952 | Moore | 315/27 |
| 3,281,726 | 10/1966 | Shaeft | 310/9.8 |
| 3,397,328 | 8/1968 | Shaeft | 310/8.6 |
| 3,487,239 | 12/1969 | Shaeft | 310/8.5 |
| 3,598,909 | 8/1971 | Sasaki | 178/7.3 R |

*Primary Examiner*—Carl D. Quarforth
*Assistant Examiner*—G. G. Solyst
*Attorney*—Chittick, Pfund, Birch, Samuels & Gauthier

[57] ABSTRACT

In a television receiver comprising a high voltage generating apparatus including a piezoelectric transducer, a pulse transformer having a primary winding responsive to the deflection current and a secondary winding and means to energize the piezoelectric transducer by a pulse voltage supplied to the primary winding at the time of blanking, there is provided a horizontal deflection circuit comprising a parallel resonance circuit comprised by the secondary winding of the pulse transformer and a capacitor for producing a third harmonic voltage wave of the blanking frequency of the horizontal oscillation signal, said third harmonic voltage wave acting to decrease the peak value of the pulse voltage.

4 Claims, 3 Drawing Figures

INVENTOR.
YASUNOBU SAKURAI
BY Chittick, Pfund, Birch Samuels & Gauthier.

HORIZONTAL DEFLECTION CIRCUITS FOR TELEVISION RECEIVERS

BACKGROUND OF THE INVENTION

The present invention relates to a horizontal deflection circuit, and more particularly to a novel horizontal deflection circuit utilizing a piezoelectric transducer element as a high voltage generating apparatus and suitable for use in transistorized television receivers.

In high voltage generating apparatus now being widely used in television receivers, a high voltage winding is wound on a fly-back transformer to cooperate with the primary winding thereof comprising the horizontal deflection circuit and the anode voltage for the receiving cathode ray tube is derived from the high voltage winding.

With this arrangement, however, it is necessary to construct the high voltage winding as a multi-layer winding by taking into consideration the distributed capacity and the line-to-line insulating strength. Further, this construction increases the physical size of the flyback transformer. For this reason this construction is not suitable for transistorized television receivers which are required to be small and compact.

To satisfy this requirement it has been proposed to connect a piezoelectric transducer element to the output terminal of a horizontal deflection circuit through a resonance circuit. Typically, a piezoelectric transducer element comprises a ceramic substrate of piezoelectric substance, a pair of driving electrodes applied to the opposite surfaces of one end of the substrate, and an output electrode applied to the opposite end surface of the substrate. An AC driving voltage is applied across the driving electrodes to cause the substrate to resonate at its natural frequency thus producing a high AC voltage at the output electrode. When a piezoelectric transducer is utilized as the high voltage generating apparatus for use in television receivers, the driving electrodes are connected in parallel with a capacitor which constitutes a series resonance circuit together with a reactance coil. One end of the capacitor is grounded while one end of the coil is connected to the pulse transformer in the horizontal deflection circuit. The pulse transformer includes a primary winding connected between a source of supply and a switching transistor, and a secondary winding acting as the source for focusing, video and blanking. One end of the coil is connected to a terminal of the primary winding which is connected to the collector electrode of the transistor.

Although this construction is advantageous in that it is possible to decrease the physical size of the pulse transformer because it is not necessary to provide the high voltage winding for the pulse transformer, it can not take the advantage of an improved design of the high voltage generating apparatus wherein the stray capacitance of the high voltage winding is used to form a LC resonance circuit, in other words a resonance condition is established by the third harmonic of the horizontal oscillation frequency by the so-called third harmonic tuning method and the third harmonic component is superposed upon the collector output of the switching transistor to compensate for the insulation strength of the transistor and to produce a high voltage of a value more than the turn ratio of the transformer.

SUMMARY OF THE INVENTION

It is therefore an object of this invention to provide an improved horizontal deflection circuit utilizing a piezoelectric transducer element and capable of operating at high efficiencies with small size. To this end a horizontal deflection circuit is utilized including a circuit resonating at the third harmonic of the horizontal oscillation frequency.

Another object of this invention is to provide an improved horizontal deflection circuit according to which the peak value of a pulse generated at the time of blanking is suppressed by the output from the resonance circuit described above, whereby to prevent damage of the transistor.

Briefly stated, in accordance with this invention, in a television receiver utilizing a piezoelectric transducer as the high voltage generating apparatus and a pulse transformer not provided with a high voltage winding as a component of the horizontal deflection circuit, a capacitor is connected in parallel with the secondary winding of the pulse transformer to form a resonance transformer, and the capacitance of the capacitor is selected to resonate at the third harmonic of the horizontal oscillation frequency. With this construction, at the time when the pulse voltage generated at the time of blanking reaches a peak, the third harmonic voltage produced by the resonance circuit reaches the maximum value of the opposite polarity. For this reason, a pulse voltage with its peak value depressed by the third harmonic voltage will appear on the collector side of the switching transistor.

DESCRIPTION OF THE PREFERRED EMBODIMENT

Figure 1:
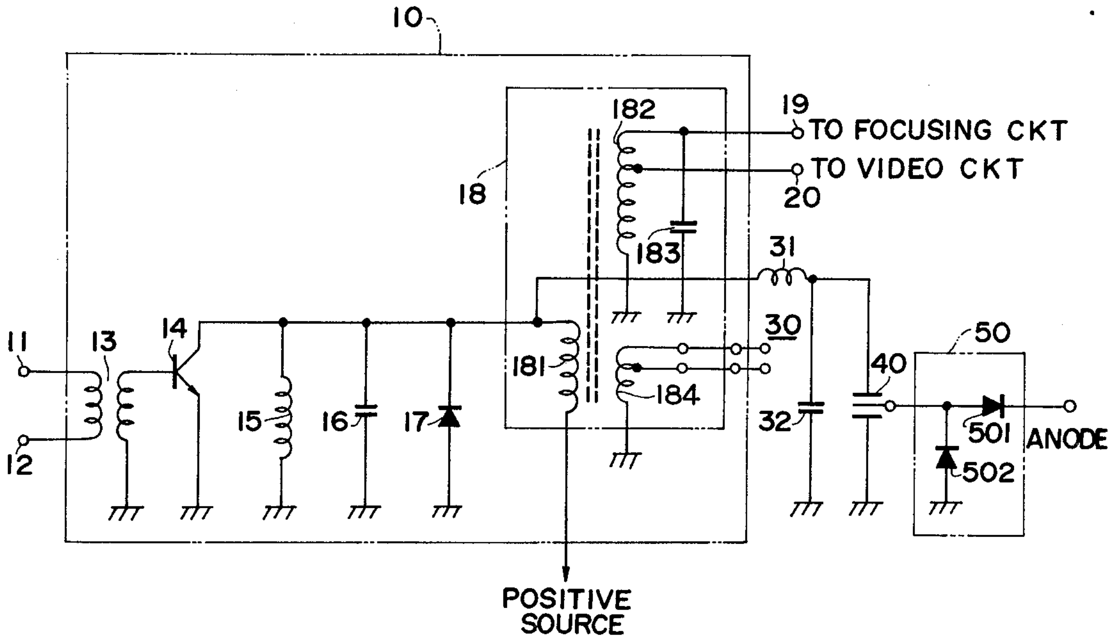
FIG. 1 is a connection diagram of a horizontal deflection circuit of a television receiver employing the novel high voltage generating apparatus using a piezoelectric transducer element.

The horizontal deflection circuit 10 shown in FIG. 1 comprises a transformer 13 having a primary winding connected to input terminals 11 and 12, a NPN-type transistor 14 with its base electrode connected to one terminal of the secondary winding of transformer 13, a deflection coil 15 connected between the collector electrode of the transistor 14 and the ground, a capacitor 16 and a damper diode 17 which are connected in parallel with the deflection coil, and a pulse transformer 18 having a primary winding 181 connected between the collector electrode of transistor 14 and a positive source. One end of each of the output windings 182, 184 of the pulse transformer 18 and the emitter electrodes of transistor 14 are grounded.

In addition to the primary winding 181, the transformer 18 includes a video and focusing secondary winding 182 and an AFC and blanking secondary winding 184. One terminal of the secondary winding is connected to the focusing circuit of the television receiver through a terminal 19 while an intermediate terminal of winding 182 is connected to the video circuit of the television receiver through a terminal 20. A capacitor 183 is connected across the secondary winding 182.

Secondary winding 182 and capacitor 183 constitute a parallel resonance circuit which resonates to the third harmonic of the blanking frequency of the horizontal oscillation signal impressed across input terminals 11 and 12. Thus, the capacitance of the capacitor 183 is determined in accordance with the inductance of the secondary winding 182.

One end of a coil 31 of a series resonance circuit 30 is connected to one terminal of the primary winding 181 of pulse transformer 18. The series resonance circuit 30 is completed by a capacitor 32 with one terminal grounded. Driving electrodes of a piezoelectric transducer 40 are connected in parallel with capacitor 32 and the output electrode of the transducer 40 is connected to the anode electrode of a cathode ray tube of a television receiver (not shown) through a rectifier circuit 50 including two diodes 501 and 502.

Figure 2A:
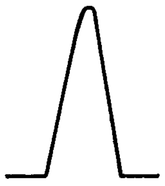
FIG. 2A shows a peak voltage wave appearing at the time of blanking.

In operation, in response to a signal impressed across input terminals 11 and 12 transistor 14 operates to provide a sawtooth deflection current to the deflection coil 15 and pulse transformer 18 produces requisite voltages on the secondary windings in response to a pulse voltage, shown in FIG. 2A, generated at the time of blanking. Concurrently therewith, the series resonance circuit 30 connected to the primary winding 181 of transformer 18 resonates and the voltage produced by the series resonance circuit is impressed across driving electrodes of the piezoelectric transducer 40.

Figure 2B:
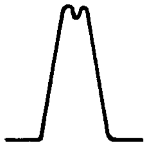
FIG. 2B shows a waveform obtained by superposing a third harmonic wave upon the peak voltage wave shown in FIG. 2A.

The parallel resonance circuit comprised by the secondary winding 182 and the capacitor 183 resonates to the third harmonic of the blanking frequency of the horizontal oscillation signal. This third harmonic voltage is determined such that it reaches the maximum amplitude of the opposite polarity when the pulse voltage generated at the time of blanking reaches the peak value so that the voltage appearing at the collector electrode of the transistor 14 will have a waveform as shown in FIG. 2B wherein the peak of the pulse voltage is suppressed by the third harmonic voltage. In other words, the crest value of the pulse voltage applied to the collector electrode of transistor 14 is decreased by the third harmonic, whereby it becomes possible to decrease the insulation strength of the switching transistor 14.

Although in the embodiment, the resonance circuit has been shown as being connected to the secondary winding 182, it is to be understood that the resonance circuit can be connected to the secondary winding 184.

It is to be understood that the invention is not limited to the particular embodiment illustrated and that many changes and modifications may be made without departing from the spirit and scope of the invention as defined in the appended claims.

What is claimed is:

1. For use in a television receiver comprising a high voltage generating apparatus including a piezoelectric transducer; a pulse transformer having a primary winding responsive to the deflection current and a secondary winding electromagnetically coupled with said primary winding; and means to energize said piezoelectric transducer by a pulse voltage supplied to said primary winding at the time of blanking, a horizontal deflection circuit comprising a parallel resonance circuit for producing a third harmonic voltage wave of the blanking frequency of the horizontal oscillation signal, said third harmonic voltage wave acting to decrease the peak value of said pulse voltage and said parallel resonance circuit being comprised by said secondary winding of said pulse transformer and a capacitor connected in parallel with said secondary winding.

2. The horizontal deflection circuit according to claim 1 wherein said primary winding of said pulse transformer is connected to the output side of a switching transistor which controls the current flowing through the deflection coil of said television receiver.

3. The horizontal deflection circuit according to claim 1 wherein said secondary winding of said pulse transformer is connected to focusing and video circuits of said television receiver.

4. The horizontal deflection circuit according to claim 1 wherein a series resonance circuit is connected to said primary winding of said pulse transformer for producing a driving voltage for said piezoelectric transducer.

* * * * *